United States Patent [19]

Hsu

[11] Patent Number: 5,146,778
[45] Date of Patent: Sep. 15, 1992

[54] OIL AND/OR WATER DETECTION APPARATUS

[76] Inventor: Charles J. Hsu, Box 460 Grand Central Station, New York, N.Y. 10017

[21] Appl. No.: 634,024

[22] Filed: Dec. 26, 1990

[51] Int. Cl.$^5$ .................................... G01M 3/32
[52] U.S. Cl. ........................ 73/61.41; 73/40.50 R; 73/49.2
[58] Field of Search ............ 73/61.1 R, 49.2, 40.5 R, 73/40.7; 340/605, 604, 618

[56] References Cited

U.S. PATENT DOCUMENTS

| | | | |
|---|---|---|---|
| 2,432,367 | 12/1947 | Andresen | 340/605 X |
| 3,427,869 | 2/1969 | Karlbom | 340/605 X |
| 3,951,812 | 4/1976 | Hsu | 73/61.1 R X |
| 4,890,485 | 1/1990 | Hsu | 73/61.1 R |
| 4,959,639 | 9/1990 | Benson | 340/605 X |

Primary Examiner—Hezron E. Williams
Assistant Examiner—Joseph W. Roskos
Attorney, Agent, or Firm—Edwin D. Schindler

[57] ABSTRACT

Apparatus for the detection of oil or water leakages having a housing with a plurality of openings. The housing is to be a sufficient volume to permit the expansion of an absorbent material when such is placed within it. Additionally, the housing is to have a hollow rod extending from it. Running through the rod is a wire. One end of the wire extends into the housing and holds a weighted member. The other end of the wire is connected to a signalling device for signalling persons of the presence of the liquid sought to be detected. When an expandable absorbent material is placed in the housing and the material detects the presence of a particular liquid, the absorbent material expands. This expansion forces the weighted member to push the wire through the hollow rod so that the signalling device is activated. In a preferred embodiment, underground leakages in oil and/or water tanks may also be detected and signalled to persons in the area. In a further preferred embodiment of the invention, apparatus for the detection of surface oil is further disclosed.

14 Claims, 4 Drawing Sheets

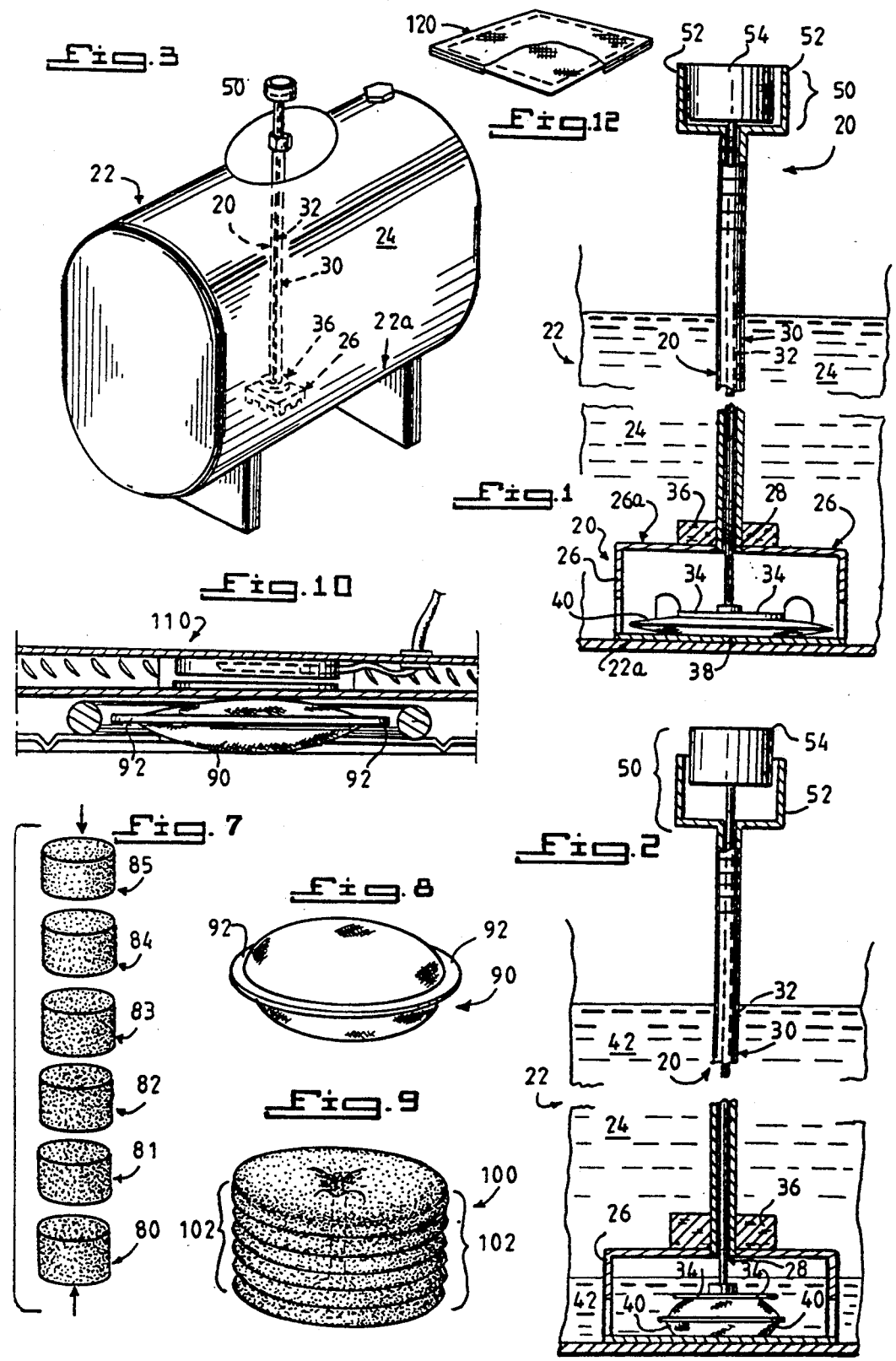

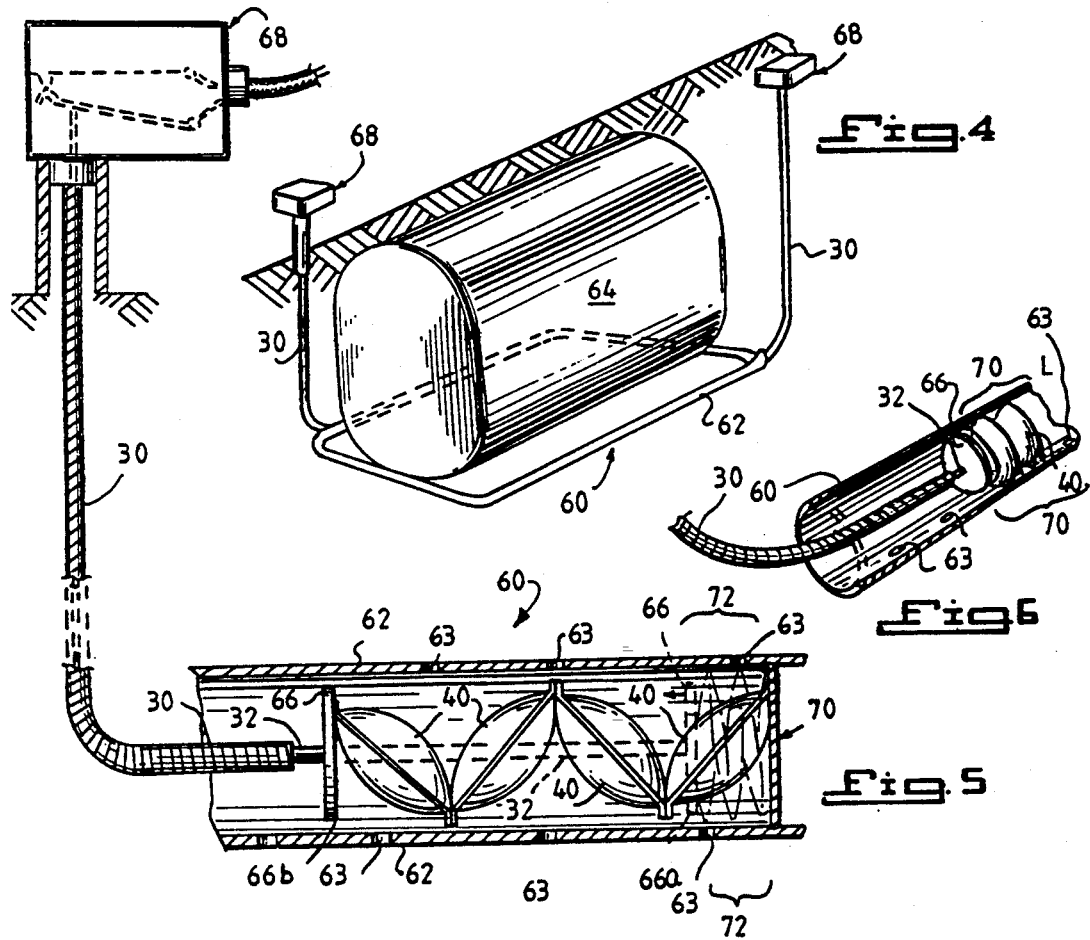

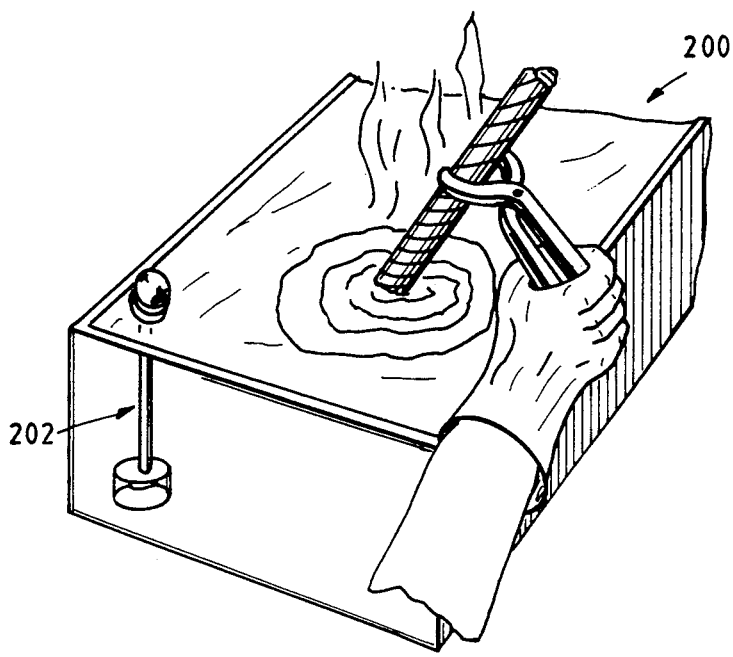
_Fig.14_
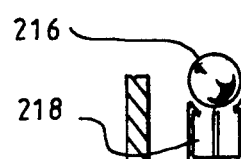
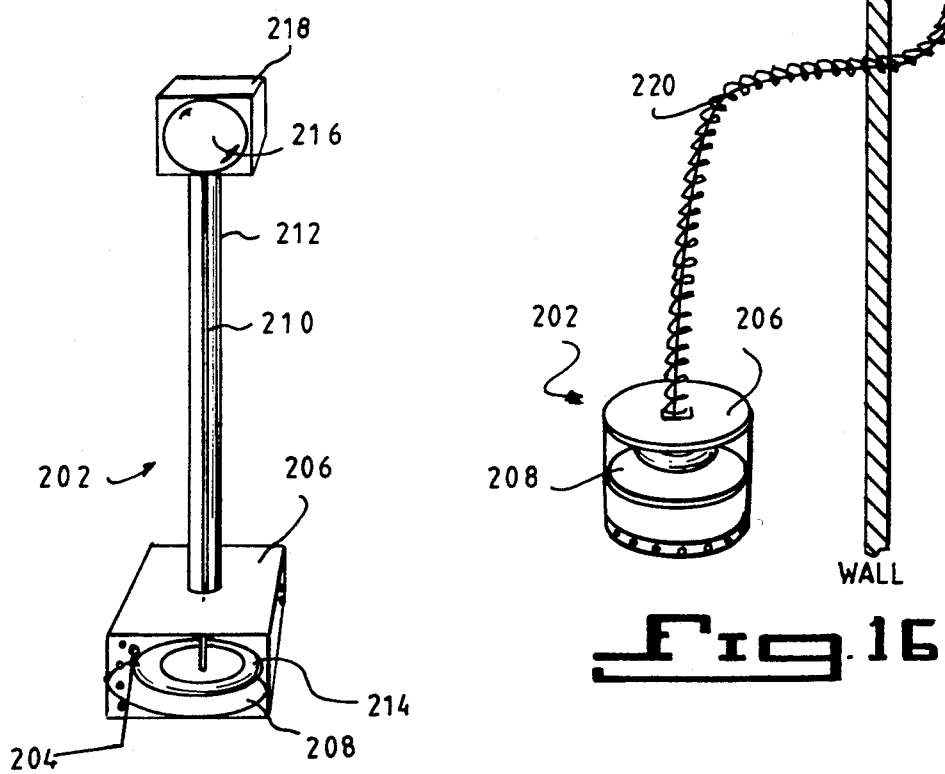
_Fig.15_
_Fig.16_

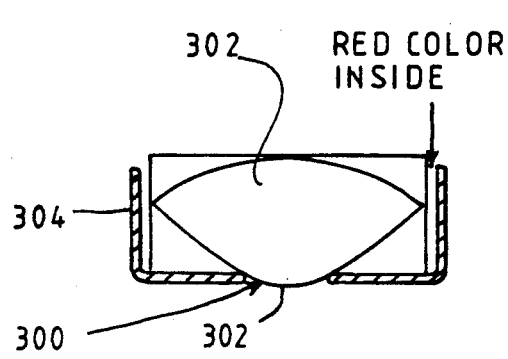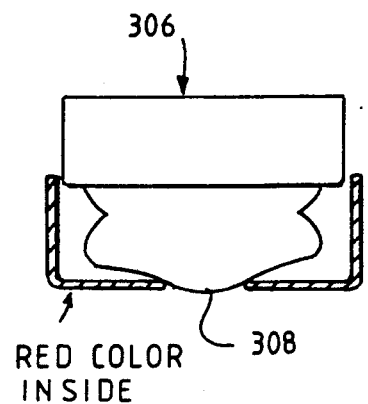
Fig.17  Fig.18
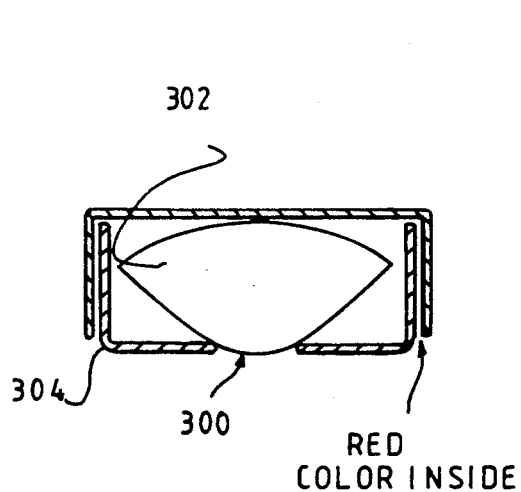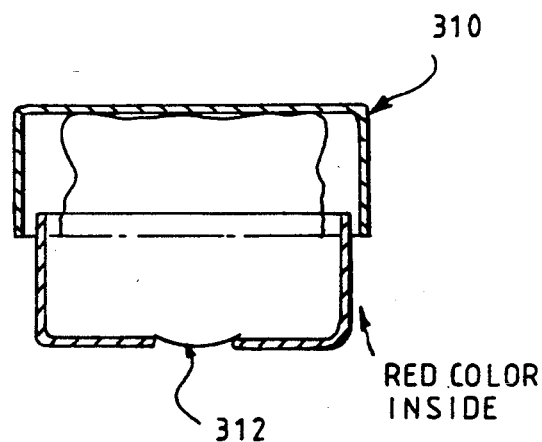
Fig.19  Fig.20

OIL AND/OR WATER DETECTION APPARATUS

BACKGROUND OF THE INVENTION

1. Technical Field of the Invention

The present invention relates generally to the detection apparatus for oil and, in certain instances, water, e.g., water leakages. More particularly, the present invention relates generally to a system to detect oil and/or water leakages that permits the detection of water on the bottom of oil tanks, including quench oil tanks, the detection of oil substances or water on or under boiler room floors or in gas stations, and the like, as well as new and useful absorbent means for their use therein.

In a preferred embodiment of the present invention, the detection apparatus of the present invention may be used for detecting water vapor in quench oil tanks. This is particularly important for prevention of an explosive build up of water vapor in said tanks. The apparatus of the invention, in a preferred embodiment, allows for an early detection of the water vapor accumulating therein.

Still a further embodiment of the present invention provides a visual detection apparatus for the detection of surface oil. More particularly, this embodiment of the present invention relates to a detection apparatus for the visual detection of surface oil which employs non-electrical means in such detection so as to reduce the fire hazard risks associated with known electrical means wherein sparks created by the use of electricity can cause ignition of the oil.

2. Description of the Prior Art

It is well known that it is difficult to detect the presence of water on the bottom of either an ordinary oil tank or a quench oil tank from outside of such a tank. Additionally, the detection of oil substances and water, if such is the case, has also been cumbersome and/or uneconomical. Until the present invention, means for the detection of water in oil, for example, have included the use of devices having quite a large number of compartments filled with a water absorbent material which have had to be lowered into, and raised from, the tank in which the presence of water was to be detected, e.g., U.S. Pat. Nos. 3,745,659; 3,951,812; and, 4,419,236, all issued to the inventor herein. The detection of the presence of water in oil could not take place with prior art devices without the removal of such devices through a tank opening, i.e., the sounding of an alarm or other signal outside of a tank when, for example, water was detected in oil did not exist.

Additionally, systems for the detection of oil or water, whether at the bottom of a tank or on a surface, relied upon absorbent materials that were often not well suited for the task. There is, for example, a need for an absorbent material that could absorb water, but not oil, and could withstand the high temperatures present at the bottom of a quench oil tank.

Quench oil tanks are employed to cool items which are heated to high temperatures, such as welded metal joints or carburized steel tools. In the course of employing such oil tanks, water will accumulate at the bottom of the tanks. The boiling point of the oil is much higher than the water, while the specific gravity of the oil is lighter than the water so that the water accumulating at the bottom of the tank will being to vaporize until its concentration is sufficiently great so that its vapor pressure will exceed that of the atmospheric pressure of the air in the area surrounding the tank so as to cause an explosion.

In order to prevent the foregoing series of events, workers are presently required to observe the quench oil tanks closely for evidence of bubbles, which would signal the time when the oil in the tank is required to be replaced. Human observation, however, is fraught with error and, therefore, there is a need to make the early detection of such water vapor both safer and, thus, prevent the foregoing hazard.

The prior art further includes surface oil detectors have been commercially available to the public and in use for some time. Known surface oil detectors are electrical devices which may be activated by various oil sensors. Illustrative of the prior art is Applicant's U.S. Pat. No. 3,562,731, issued Feb. 9, 1971. Such detectors presently known to the art, however, pose a potential fire hazard. This fire hazard is caused, in part, because of the likelihood that sparks generated in the electrical system, such as, for example, those occurring in contact switches, are capable of igniting nearby oil.

Additionally, such electrical devices are also prone to insulation degradation. This occurs as a result of the fact that the elastomers, which coat the wires of such detection devices, undergo swelling, solvent deterioration and an overall degradation resulting from exposure to the volatile vapors arising from oil components, as well as from a direct contacting with the oil.

Heretofore, the prior art has lacked a sufficiently safe detection apparatus for detecting surface oil which avoids the foregoing hazards.

SUMMARY OF THE INVENTION

It is, therefore, an object of the present invention to provide a detection system capable of being adapted for the detection of oil and/or water, depending upon the circumstances of concern, and signalling the presence of such liquids to persons in the area.

It is a further object of the present invention to provide absorbent means that are more suitable than presently known means for use in the detection of oil or water.

It is still a further object of the present invention to provide an absorbent material that is capable of withstanding extremely high temperatures so that it may be useful in detecting water at the bottom of a quench oil tank, including the detection of water vapor within such tank.

It is yet a further object of the present invention to provide a suitable covering for the absorbent means employed in the detection system/apparatus of the present invention and in certain prior art detection systems.

It is a further object of the present invention to provide apparatus for the detection of surface oil which reduces, if not eliminates, the known fire hazard inherent in surface oil detection devices presently known to the prior art.

It is an object of the present invention to provide apparatus for the detection of surface oil which will be less prone to degradation, as discussed heretofore, in an oil environment or otherwise upon exposure to oil and its vapors.

It is an additional object of the present invention to provide apparatus for the detection of surface oil which will utilize non-electrical means in such detection.

It is, yet, a further object of the present invention to provide apparatus for the detection of surface oil which will be particularly economical, as compared to devices known to the prior art.

It is still a further object of the present invention to provide apparatus for the detection of surface oil which will overcome the disadvantages inherent in the detection apparatus known to the prior art.

Accordingly, the foregoing and related objects of the present invention are achieved by a detection apparatus providing an oil and/or water detection system having a housing with, preferably, a plurality of openings to permit the liquid to be detected to fill the housing. The housing should be made of a durable material, preferably metal, and have a base that ensures that it stands upright, e.g., a flat lower surface. The housing is to be placed at the bottom of an oil tank or similar area where the liquid to be detected is thought to possibly exist. The housing is to have a hole in its roof, or upper surface, through which detection means to the outside of the tank, or similar area, are to extend. Such detection means are, preferably, a hollow rod or similar object with a wire running therethrough. The lower end of the wire holds a weighted member, preferably a flat disk. The upper portion of the wire, which is to extend to the outside of the tank, is to hold or connect to signalling means to indicate when the liquid sought to be detected is present.

Detection of a particular liquid is to occur as follows: The housing of the detection means is to have several openings including, preferably, a large opening through the center of the lower surface of the housing. Absorbent means are to be placed in the housing, either on the lower surface of the housing or, preferably, in a center opening in the lower surface of the housing so that the absorbent means are within the confines of the housing. The absorbent means are to rest immediately beneath the weighted member attached to the signalling wire. The weighted member may, but need not, actually contact the absorbent means prior to detection of the liquid sought to be detected. Once in place, the absorbent means, which may be material that absorbs only oil, only water, or both types of liquids, remains undisturbed until the liquid sought to be detected is actually present. When, for example, a water absorbent material detects the presence of water at the bottom of an oil tank, the absorbent material will expand to many, and possibly, hundreds of times its original volume. The absorbent material employed, upon expansion, will exert an upward pressure, for example, on the weighted member, located in the housing, affixed to the bottom of the wire. To ensure that the absorbent means forcefully exerts a pressure on the weighted member of the wire, the absorbent means may be enclosed within a porous envelope, which should be a multi-ply material, for example, made out of cotton. The wire, which extends through the hollow rod to the outside of the tank, or similar area, would activate an alarm or some other signal, whether based on sound, sight or light, etc., which will alert persons in the area that, for example, water is present at the bottom of the oil tank of concern.

In a modification of the present invention, oil and/or water absorbent material can be placed in a housing with openings. The housing may then be placed on a surface or beneath a surface, such as, for example, in a gas station where gasoline tanks are located. From at least one portion of the housing, one end of a rod with a wire running therethrough, as described above, would be inserted into the housing. The other end of the rod would extend to an area where persons could be altered as to the detection of the presence of a particular liquid. The end of the wire, which is within the housing, is provided with a weighted member at its end. This weighted member is preferably a disk. When the liquid to be detected finds its way into the housing, the absorbent material therein will begin to expand. The expansion force exerted by the expanding absorbent material will press against the weighted member affixed to the end of the wire. The wire will be forced through the rod and will activate an alarm, or other signalling means, to persons n the area that the presence of a particular liquid has been discovered. The dimensions of the housing, which contain the desired absorbent material, may be of any dimensions and will usually depend upon the area in which it is believed that the detection of a particular liquid is possible.

As part of the present invention, certain preferred absorbent means may be used. For example, if one desired to detect the presence of water only, a powdery synthetic super absorbent material, e.g., a flour-polyacrylonitrile graft polymer composition which is disclosed in U.S. Pat. No. 4,045,387, may be securely wrapped in two or more layers of a porous material such as, for example, cotton. The porous material, containing the desired absorbent material would then be placed in the detection apparatus, as described above and as will be explained in greater detail hereinafter.

If one desires to detect the presence of water at the bottom of a quench oil tank, one should soak the absorbent material disclosed in the foregoing patent in water. Once thoroughly soaked in water, one should dry the material. The dried material will retain its ability to absorb water, but not oil, and will have the added benefit of being able to withstand the high temperatures existing at the bottom of a quench oil tank.

In a preferred embodiment of the present invention, the foregoing absorbent material, i.e., acting as a release mechanism, will activate a visual indicator by the pressure produced by the water vapor existing at the bottom of a quench oil tank. The details of this preferred embodiment of the invention will be set forth in the detailed description of the relevant drawing figures.

If one desires to detect the presence of oil only, one may employ a PM or polyethylene molecular sponge, e.g., the polyethylene molecular sponge sold under the trademark "Sentinel Quick-Sorbs Oil and Gas Wipes," distributed by Sentinel Fitness Products, 130 North Street, Hyannis, Mass. 02601, U.S.A. The use of such a sponge should, preferably, be by the compression of many such sponges into a spherical, oval or similarly shaped object.

In a further preferred embodiment of the invention, an apparatus for the detection of surface oil which includes a multi-part, preferably a two-part, container, preferably having a metallic construction. The container is provided with an oleophilic material capable of expansion upon contact with oil which will act as a mechanical release mechanism. An example of an oleophilic material capable of use in combination with the present invention is the polyethylene sponge disclosed in Browers et. al., U.S. Pat. No. 4,183,984, the relevant portions of which are herein incorporated by reference. Other examples of such oleophilic materials capable of absorbing oil are generally known to persons of ordinary skill in the art.

A bottom portion of the container of the invention has a hole therethrough through which the oleophilic material protrudes so as to act as an oleophilic sensor.

When the container is placed on a surface, e.g., a planar surface or floor, it will remain inactive until oil contacts the oleophilic material protruding through the lower opening of the container. The oil will then cause the oleophilic material, or sensor, to expand so as to act as a release mechanism which will cause the two, or more, parts or sections of the container separate along a predetermined fault, or perforated, line.

The separation of the two sections, or parts, of the container of the present invention will cause a hidden section, originally within the container, to be revealed. The hidden section is, preferably, vividly colored for easy and quick visual recognition by persons in the area, or some other detection means.

Should the hidden portion of the container, i.e., an inner portion of the container, be the upper part of the container, then a signal will be revealed as the upper separating part of the container. This mode of carrying out the invention is most preferred.

If, by contrast, the container was to be constructed so that the perforated inner section of the container rested on a surface, the bottom part of the container would be capable of serving as the visual signal.

Other objects and features of the present invention will become apparent from the following detailed description, when taken in combination with the accompanying drawing, which discloses several embodiments of the invention. It is to be understood that the drawing is designed for the purpose of illustration only and is not intended as a definition of the limits of the invention.

BRIEF DESCRIPTION OF THE DRAWING FIGURES

In the drawing, wherein similar reference numerals denote similar features throughout the several views:

FIG. 1 is a partial cross-sectional, elevational view of an apparatus, according to the present invention, for detecting, e.g., water at the bottom of an oil tank prior to the detection of any water;

FIG. 2 is a partial, cross-sectional elevational view of the apparatus of FIG. 1, subsequent to the detection of water, for example, at the bottom of an oil tank;

FIG. 3 is a perspective view of the apparatus of FIG. 1 in an oil tank with the apparatus of the present invention being shown in phantom;

FIG. 4 is a perspective view of an apparatus according to the present invention shown in a possible relationship with a tank containing a liquid for detecting leakages in underground oil and/or water containing tanks;

FIG. 5 is a partial, cross-sectional elevational view of the underground liquid detection apparatus of the present invention, as per FIG. 4;

FIG. 6 is a cross-sectional, perspective view of the inventive underground liquid detection apparatus of FIGS. 4 and 5;

FIG. 7 is an exploded elevational view of six polyethylene molecular sponges, which absorb oil but not water, for use in the present invention;

FIG. 8 is a perspective view of the polyethylene molecular sponges of FIG. 1, compressed in a preferred form according to the present invention for use in the invention;

FIG. 9 is a perspective view of the polyethylene sponges of FIG. 1 compressed in an alternative preferred form for use in the present invention;

FIG. 10 is a cross-sectional, elevational view of the absorbent material shown in FIG. 8 in a prior art apparatus capable of detecting surface moisture;

FIG. 11 is a sketch of a plan view of a synthetic super absorbent material which will absorb only water for use in the present invention;

FIG. 12 is a perspective view of a multi-ply porous material containing the synthetic super absorbent material of FIG. 11;

FIG. 13 is a sketch of a plan view of a heat resistant, synthetic super absorbent material for use, for example, in quench oil tanks, according to the present invention;

FIG. 14 is a prospective view of a quench oil tank with a preferred water vapor detection apparatus of the present invention;

FIG. 15 is a prospective view of the detection apparatus of FIG. 14, wherein the water vapor detection apparatus is actuated by water vapor which activates a release mechanism and, thus, visual signal means;

FIG. 16 is a prospective view of a further embodiment of the present invention illustrating the detection apparatus of FIG. 14;

FIG. 17 is a cross-sectional side view of the visual surface oil detector of the present invention, prior to separation, with the outer section of the detector lying on a planar surface;

FIG. 18 is a cross-sectional side view of the visual surface oil detector of FIG. 17, after separation;

FIG. 19 is a cross-sectional side view of the visual surface oil detector of the present invention, prior to separation, with the inner section of the detector lying on a planar surface; and, FIG. 20 is a cross-sectional side view of the visual surface oil detector of FIG. 19, after separation.

DETAILED DESCRIPTION OF THE DRAWING FIGURES

Turning now, in detail, to an analysis of the drawing figures, FIGS. 1-3 show an oil and/or water detection apparatus 20 according to the present invention, in a tank 22 containing a liquid 24. While the present invention may be adapted for detection of the presence of oil, water or both substances, for convenience in discussing the invention, reference will be made to an oil tank with the liquid sought to be detected in the tank being water. For the purposes of discussion, liquid 24 is, therefore, oil.

In FIG. 1, it can be seen that detection apparatus 20 has a durable housing 26, which is preferably made of a metal, and having a base that ensures that it stands upright, e.g., a flat lower surface. The housing 26 is placed on the lower surface 22a of oil tank 22 where water may be present. Housing 26 is to have several openings so that liquid 24 completely fills housing 26. Housing 26 is to have a hole 28 in its upper surface 26a, through which detection means are, preferably, a hollow rod 30 with a wire 32 running therethrough. The lower end of wire 32 hold a weighted member, preferably, a flat disk 34. The upper portion of wire 32, which is to extend to the outside of tank 22, is to hold, or otherwise be connected to, signalling means to alert those persons in the area that the liquid sought to be detected, e.g., water in oil, is present. To ensure that rod 30 is held upright, it is preferable, though not essential, to attach a float cork 36 to rod 30. Among the several openings that housing 26 should, preferably, have is opening 38, located centrally through the lower surface of the housing.

Detection of a liquid, for example, water in oil, occurs as follows: An absorbent material 40 is placed in housing 26. If one is attempting to detect water in oil, one should use an absorbent material that would absorb water, but not oil. In other situations, where one would want to detect the presence of oil, one would use an absorbent material. Numerous absorbent materials for use in the present invention are discussed hereinafter. Absorbent material 40 is placed immediately beneath weighted member 34 with the weighted member resting on the absorbent material. When the presence of, for example, water 42 (see, FIG. 2) is detected in oil, absorbent material 40, which would only absorb water, would expand, as shown in FIG. 2. The expansion pressure of absorbent material 40 would force weighted member 34 upward which, in turn, would force wire 32 upward through rod 30. The upward movement of wire 32 would signal to persons outside of the tank 22, the presence of, for example, water in oil. A preferred signalling means 50 comprises two cups 52, 54 with cup 52 completely retaining cup 54 within it. Cup 52 is to be fixed to rod 30 so that it remains stationary. Cup 54 is to be fixed to the upper portion of wire 32 with wire 32 passing through cup 52. When absorbent material 40 expands and forces wire 32 upward through rod 30, cup 54, the upper rim of which is originally flush with the rim of cup 52, is partially raised out of cup 52, thereby visually altering persons that, for example, water exists in an oil tank. It will be obvious to those persons skilled in the art that countless signalling means, both visual and audio, are possible as the alert mechanism. The invention isn't so limited to that shown n the accompanying drawing figures. So that absorbent material, once expanded, can be replaced with an unexpanded absorbent material (thereby allowing a new detection to take place) tank 22 is to have an opening that is sufficiently wide in order to permit the insertion and removal of the inventive detection device.

FIGS. 4–6 present a modification of the present invention wherein the inventive liquid detection system may be modified to that designated by reference numeral 60. Apparatus 60 is intended for the detection of underground leakages in water or oil tanks. As shown in FIG. 4, this apparatus may be placed in relation to an underground tank 64 (as used in a gas station) so that it encircles it. This apparatus included a rigid housing 62 with openings 63. This housing is, preferably, cylindrical though other shapes are possible. Within the housing is a weighted member which, in the embodiment of the present invention shown in FIGS. 4–6, will be designated by reference numeral 66. This weighted member is preferably a circular disk. Referring particularly to FIG. 5, weighted member 66 is affixed to the lower end of a wire 32, which runs through a hollow rod 30. The upper end of wire 32, within rod 30, is in contact with signalling or alarm means 68. Signalling means 68 is located at or above ground level so that the presence of an underground leakage from tank 64 may be signalled to persons in the area. A variety of signalling means may be employed, such as those means discussed in relation to the embodiment of the present invention shown in FIGS. 1–3. Prior to the detection of a leakage from tank 64, weighted member 66 is in an initial position, as designated by reference numeral 66a (shown in phantom in FIG. 5.) Within housing 62, to the side of weighted member 66 that faces away from the signalling means and extending to a rigid wall 70, said area being designated by numeral 72, is placed absorbent material 40. A sufficient quantity of absorbent material 40 is placed in area 72 so that it completely fills area 72 between weighted member 66 and wall 70. The type of absorbent material used will depend upon the type of liquid sought to be detected. Upon a leakage from tank 64, liquid form the tank will seep through openings 63 and into area 72 of housing 62. This seepage will cause absorbent material 40 to expand thereby exerting an expansion pressure upon weighted member 66 that presses weighted member 66 from position 66a toward 66b. This displacement of weighted member 66, in turn causes wire 32 to move upward through rod 30 thereby activating the signalling means 68 necessary to alert persons in the area of the presence of a leakage from underground tank 64. The absorbent material must then be replaced and means for its removal from below ground are necessary. A plurality of the arrangements shown in FIG. 5 are possible (see, also, FIG. 4.)

Turning now to consideration of the absorbent materials which may be used in the present invention, for the detection of water, a release mechanism that is activated in water, but not in oil, is fully disclosed in the inventor's prior art patent, U.S. Pat. No. 3,280,549, issued on Oct. 25th, 1966, said disclosure being incorporated herein by reference. The release mechanism of U.S. Pat. No. 3,280,549, includes an expandable powder made from a plant known as *Sterculia lychnophora* Hance, and if dried and ground or pulverized, can expand to more than fifteen times its volume when immerged in water. A further release mechanism which reacts to the presence of water at temperatures which are present in a quench oil tank is disclosed in the inventor's patent issued on Jan. 2nd, 1990, i.e., U.S. Pat. No. 4,890,485, the disclosure of which is incorporated herein by reference. (U.S. Pat. No. 4,890,485 is not citable as prior art against the instant Specification.) Other water absorbent materials may, of course, also be employed in the present invention. Some of the absorbent materials for use in the invention will now be discussed.

FIG. 7 shows six cylindrical polyethylene molecular ("PM") sponges 80, 81, 82, 83, 84, 85, which are distributed by Sentinel Fitness Products, which are capable of absorbing oil, but not water, up to 32 times their volume. For use in the present invention, such as the modification shown in FIGS. 4–6, it is preferable that approximately six of the PM sponges, shown in FIG. 7, be compressed in a fashion, as shown in either FIG. 8, as designated by reference numeral 90, or FIG. 9, as designated by reference numeral 100. Absorbent material 30 is made by compressing the edges of PM sponges 80, 81, 82, 83, 84, 85 retain their oval shape, the edges of PM sponges should be compressed so that a cardboard thin rim 92 is formed. It should be emphasized that the embodiment shown in FIG. 8 for an oil absorbent sponge is also possible for a water absorbent sponge.

FIG. 9 illustrates another embodiment 100 of how the PM sponges of FIG. 7 may be compressed for use in the present invention. The PM sponges 80, 81, 82, 83, 84, 85 are compressed vertically at their centers. The advantage of this embodiment is that absorbent material 100 has a greater ability for absorbing oil along its curved side 102. It should be noted that rim 92 of absorbent material 90 is incapable of absorbing oil because it is compressed to the point of being cardboard thin. This is in accordance with the rule that all materials so compressed will lose any ability they may had to absorb oil.

Finally, it should be noted that the absorbent materials 90 and 100 is FIGS. 8 and 9, respectively, may be formed by compressing any number of PM sponges (or other absorbent material), though the compression of six sponges is preferred.

FIG. 10 shows the use of absorbent material 90 in a prior art device developed by the inventor for detecting surface water. This prior art detection device 110 is fully disclosed in U.S. Pat. No. 3,562,731, issued Feb. 9th, 1971; the disclosure of this patent being fully incorporated by reference into the present disclosure. It should be pointed out that device 110 may be used to detect surface water or oil, depending upon the type of expandable absorbent material used in the device. Absorbent material 90 may be placed in device 110, as illustrated in FIG. 4. Upon the presence of a surface liquid, such as oil, absorbent material 90 will expand. The pressure caused by the expansion force of the absorbent material will trigger an electric signal or alarm.

FIG. 11 shows a known synthetic super absorbent powdery material which expands greatly in the presence of water, but not oil, and which is also available for use in the detection apparatus of the present invention. The water absorbent substance shown in FIG. 11 is fully disclosed in U.S. Pat. No. 4,045,387, issued Aug. 30, 1977, and is incorporated by reference herein. The water-absorbent material of U.S. Pat. No. 4,045,387 is a flour-polyacrylonitrile graft polymer composition. This powdery substance may conveniently be utilized in the detection apparatus of the present invention by fully enclosing this substance in a multi-ply porous material that is capable of sufficient expansion, e.g., cotton (see, FIG. 12.) A multi-ply porous container 120 is advisable in order to sufficiently contain the expansion force of this absorbent substance which is capable of expanding to greater than 100 times its volume. Without a proper container, such as the one illustrated in FIG. 12, the expansion force of this absorbent powdery substance might not be properly directed in the apparatus in FIGS. 1-6 and 10 to efficiently trigger the alarm mechanisms.

Finally, the water absorbent substance shown in FIG. 11 may be modified for use in the apparatus shown in FIGS. 1-6 to detect water, for example, at the bottom of a quench oil tank. As is well known to persons skilled in the art, temperatures at the bottom of a quench oil tank can be extremely high. The absorbent disclosed in U.S. Pat. No. 4,045,387 (see, FIG. 11) cannot withstand such temperatures. By soaking this water absorbent substance in water, then drying this substance, preferably by freeze drying, this substance will then be modified to withstand such high temperatures, as those that exist at the bottom of a quench oil tank. This substance is shown in the sketch of FIG. 13. For use in the apparatus of the present invention, this substance may be placed in any commercially available expandable (preferably, multi-ply) container capable of withstanding the necessary temperatures, e.g., porous cotton material.

In a preferred embodiment of the present invention, FIG. 14 illustrates a quench oil tank 200 with a water vapor detector 202 contained therein, which is detailed in FIG. 15. In FIG. 15, the illustrated water vapor detection apparatus is activated by water vapor bubbles 204 within quench oil tank 202. The water vapor detector 202 includes a porous housing 206, which may be a various shapes, such as cubic, as shown in FIG. 15, or cylindrical, as best shown in FIG. 16.

Within housing 206 is a release mechanism 208. This release mechanism would be one which reacts to the presence of water and is capable of withstanding temperatures generally existing at the bottom of a quench oil tank. A preferred release mechanism for use in the embodiment of the invention illustrated in FIGS. 14-16 includes a flour-polyacrylonitrile graft polymer composition for use as an absorbent material, which has been discussed above and is disclosed in U.S. Pat. No. 4,045,387. This polymer composition should then be treated by soaking in water and subsequently dried.

Release mechanism 208, in the presence of water vapor, would expand with the porous housing 206. The pressure created within housing 206 resulting from expansion of release mechanism 208 will cause of rod, or wire, as designated by reference numeral 210 to move upward within a cylindrical channel 212 (see, FIG. 15.) Connected to the lower end of rod 210, within housing 206, is preferably a diaphragm 214, which readily raises rod 210 through channel 212 when release mechanism 208 expands within housing 206, in the presence of water vapor.

Connected to the upper end of rod 210, are indication means for signalling the presence of water vapor in response to the upward movement of rod 210 within cylindrical channel 212. Such indication means may be either electronic or non-electronic, and may be visual, audio or a combination of visual and audio indicators. In the embodiment illustrated in FIG. 15, a brightly-colored sphere 216 is normally concealed within a casing 218, which includes an upper opening so that sphere 216 is able to move upwardly in response to an upward movement of rod 210. Such upward movement of sphere 216 allows the brightly-colored sphere 216 to become visible to persons in the area and, thereby, warns of the presence of water vapor within quench oil tank 202. It should, of course, be appreciated that the upward movement of rod 210 can readily devised to trigger the initiation of an audio alarm or other visual and/or audio means which can warn persons of the presence of water vapor within tank 202 who might be remote from the area. Such would be preferred for safety reasons.

FIG. 16 presents an alternative embodiment of that presented in FIG. 15. In FIG. 16, casing 218 is substantially cylindrical. Additionally, instead of having rod 210 move upward within cylindrical channel 212, the embodiment of FIG. 16, utilizes a push-pull wire in which, essentially, a rod is fixed within a flexible, movable cylindrical wire 220. The concept is similar to that presented in the embodiment illustrated in FIG. 15, including the indication means.

In FIG. 16, the means for indicating the presence of water vapor within tank 202 is shown as being separated by a wall. Such illustration is intended as an example by which the indication means of the invention is placed at a location remote from the quench oil tank itself. Such a construction is preferred for safety reasons.

The sphere 216 utilized in the embodiments of the invention illustrated in FIGS. 15 and 16 is preferably made of a hot-oil resistant material having a specific gravity which is less than that of water. Among the preferred materials for constructing such sphere 216 are cork, sponge, urethane foam and low-density polysulfone.

Turning to an analysis of preferred embodiment of the invention as illustrated in drawing FIGS. 17, 18, 19 and 20, FIGS. 17 and 19 show an oleophilic portion 300, which constitutes a portion of, or actually is, in its entirely, release mechanism 302 (which may be one of the release mechanisms previously described herein) protruding through a hole in an outer section of container 304. When surface oil contacts oleophilic portion 300, it is actuated into its active mode 308 and causes an inner section 306 of container 304 to separate thereby revealing a red (or other brightly colored) signal which is the color of inner section 306 of container 304, as illustrated in FIG. 18.

In the case where the bottom inner portion of container 304, which has a hole in it rests on a planar surface, actuation of the release mechanism will cause an outer section 310 to separate revealing the bright color, preferably red, of the bottom inner section 312 of the visual oil detector of the present invention, as shown in FIG. 20.

It will be apparent to those of ordinary skill in the art that many modifications may be made to the present invention. For example, the color of the visual oil detector may be appropriately varied. In addition, the containers of the present invention may be of a rounded shape, rather than rectangular, and could be constructed of oil resistant composites, rather than being entirely of metal, such as electroplated plastics.

While only several embodiments of the present invention have been shown and described, it will be obvious to those of ordinary skill in the art that many modifications may be made to the present invention without departing from the spirit and scope thereof.

What is claimed is:

1. Apparatus for detecting the pesence of oil or water on a surface, under a surface or at the bottom of a liquid-containing tank, comprising:
   an expandable absorbent material;
   a housing having an upper and a lower surface and a plurality of openings, including an opening in said upper surface, said housing containing said expandable absorbent material therein;
   a hollow rod extending from said opening in said upper surface of said housing;
   a wire running through said hollow rod with a first end of said wire extending into said housing and said wire having a second end;
   a weighted member affixed to said first end of said wire within said housing; and,
   means for signalling the presence of oil or water, said signalling means being activated by a pressure on said wire, said pressure being exerted by an expansion force, against said weighted member, created by said expandable absorbent material when having expanded upon the absorption of the liquid substance sought to be detected.

2. The apparatus for detecting the presence of oil or water according to claim 1, further comprising a float cork affixed to said hollow rod for maintaining said rod in a vertical position when said position is desired.

3. The apparatus for detecting the presence of oil or water according to claim 1, wherein said lower surface of said housing has an opening centrally located.

4. The apparatus for detecting the presence of oil or water according to claim 1, wherein said means for signalling comprise a stationary outer cup affixed to said rod and an inner cup, located within said outer cup, said inner cup being affixed to said wire so that when said wire is forced upward by said upward pressure, said inner cup rises out of said outer cup to visually signal the presence of the liquid sought to be detected.

5. The apparatus for detecting the presence of oil or water according to claim 1, wherein said signalling means is an audio signal.

6. The apparatus for detecting the presence of oil or water according to claim 1, wherein said expandable absorbent material absorbs only water so that said apparatus is capable of detecting the presence of water in oil.

7. Apparatus for detecting the presence of an oil or water leakage, comprising:
   an expandable absorbent material;
   a rigid housing with a plurality of openings, said rigid housing containing said expandable absorbent material therein;
   a rigid wall within said housing;
   a hollow rod extending from an opening in said housing;
   a wire running through said hollow rod with a first end of said wire extending into said housing and said wire having a second end;
   a weighted member affixed to said first end of said wire within said housing, said weighted member and said rigid wall creating an area filled with said expandable absorbent material; and,
   means for signalling the presence of oil or water, said signalling means being activated by a pressure being exerted by said second end of said wire which results from a pressure being exerted by an expansion force against said weighted member created by said expandable absorbent material when having expanded upon the absorption of the liquid sought to be detected.

8. The apparatus for detecting the presence of oil or water leakage according to claim 7, wherein said signalling means is an audio signal.

9. The apparatus for detecting the presence of oil or water leakage according to claim 7, wherein said signalling means is a visual signal.

10. A visual surface oil detector, comprising:
    a multi-part container having an inner side and an outer side, said multi-part container further having a hole in a bottom surface, said inner side being brightly colored and not visible from the outer side of said multi-part container when said container is closed; and,
    a release mechanism inside said multi-part container, said release mechanism including an oleophilic absorbent material protruding through the hole in the bottom surface of said multi-part container, said release mechanism being capable of being activated by the absorption of an oleophilic liquid by said oleophilic absorbent material so that said oleophilic absorbent material expands and causes a separation of parts of said multi-part container thereby revealing the brightly colored inner side of said multi-part container and visually indicating the presence of the oleophilic liquid.

11. The visual surface oil detector according to claim 10, wherein said multi-part container is made of a metal.

12. The visual surface oil detector according to claim 10, wherein said inner side of said multi-part container is brightly colored red.

13. The visual surface oil detector according to claim 10, wherein said multi-part container has two parts.

14. The visual surface oil detector according to claim 10, wherein said oleophilic absorbent material is a polyethylene sponge.

* * * * *